United States Patent
Zhang et al.

(10) Patent No.: US 10,248,661 B2
(45) Date of Patent: Apr. 2, 2019

(54) METHOD AND DEVICE FOR PULLING VIRTUAL MACHINE MIRROR FILE

(71) Applicant: BEIJING BAIDU NETCOM SCIENCE AND TECHNOLOGY, LTD., Beijing (CN)

(72) Inventors: Yu Zhang, Beijing (CN); Zhen Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 15/239,577

(22) Filed: Aug. 17, 2016

(65) Prior Publication Data

US 2017/0124114 A1    May 4, 2017

(30) Foreign Application Priority Data

Oct. 28, 2015   (CN) .......................... 2015 1 0712857

(51) Int. Cl.
*G06F 8/61* (2018.01)
*G06F 17/30* (2006.01)
*G06F 9/455* (2018.01)

(52) U.S. Cl.
CPC .......... *G06F 17/30233* (2013.01); *G06F 8/63* (2013.01); *G06F 9/45558* (2013.01); *G06F 17/30091* (2013.01); *G06F 17/30106* (2013.01); *G06F 2009/45562* (2013.01); *G06F 2009/45583* (2013.01)

(58) Field of Classification Search
CPC .. G06F 17/30233; G06F 8/63; G06F 9/45558; G06F 17/30091; G06F 17/30106; G06F 2009/45562; G06F 2009/45583
See application file for complete search history.

(56) References Cited

U.S. PATENT DOCUMENTS

| | | | |
|---|---|---|---|
| 9,740,514 B1 * | 8/2017 | Memon | G06F 9/45533 |
| 2014/0149696 A1 | 5/2014 | Frenkel et al. | |
| 2015/0154042 A1 * | 6/2015 | Katayama | G06F 9/45533 718/1 |

(Continued)

FOREIGN PATENT DOCUMENTS

| | | |
|---|---|---|
| CN | 102214118 A | 10/2011 |
| JP | 2014-21754 A | 2/2014 |

*Primary Examiner* — Sisley N Kim

(57) ABSTRACT

A method and device for pulling a virtual machine mirror file includes: obtaining a mirror pulling instruction comprising a timestamp of a mirror file; determining whether the mirror pulling instruction instructs only a base mirror file; if yes, obtaining locally the base mirror file previously dispatched to physical machines; and if not, obtaining locally the base mirror file previously dispatched to physical machines, and obtaining an incremental file matching the timestamp of the mirror file. The amount of data of the virtual machine mirror file to be pulled by the virtual machine mirror management module is reduced by using the base mirror file previously dispatched to physical machines, such that the pulling period is shortened, and the loads of a server where the virtual machine mirror management module is located and the loads of the mirror server are decreased. Accordingly, the creation of the virtual machine may be accelerated.

19 Claims, 5 Drawing Sheets

(56) References Cited

U.S. PATENT DOCUMENTS

2015/0244802 A1\* 8/2015 Simoncelli .......... G06F 9/45558
                                                    709/219
2016/0266892 A1\* 9/2016 Sn ............................ G06F 8/68
2017/0255526 A1\* 9/2017 Barnes ................ G06F 11/1469

\* cited by examiner

METHOD AND DEVICE FOR PULLING VIRTUAL MACHINE MIRROR FILE

CROSS-REFERENCE TO RELATED APPLICATION

This application is related to and claims priority from Chinese Application No. 201510712857.0, filed on Oct. 28, 2015, entitled "METHOD AND DEVICE FOR PULLING VIRTUAL MACHINE MIRROR FILE", the entire disclosure of which is hereby incorporated by reference.

FIELD OF THE INVENTION

The present application relates to the field of computer technology, specifically relates to the field of virtual machine technology, and more specifically to a method and device for pulling a virtual machine mirror file.

BACKGROUND OF THE INVENTION

In the prior art, when a cloud computing platform architecture (e.g., an open-source cloud computing management platform architecture OpenStack) creates a virtual machine, a virtual machine management module (e.g., an operation component Nova in OpenStack) in the cloud computing platform architecture can retrieve a mirror file through a virtual machine mirror management module (e.g., a virtual machine mirror lookup and retrieval component Glance in OpenStack) and pull the mirror file from a mirror server to create the virtual machine.

Using KVM, a virtual machine based on a hardware virtualization technology, as an example, the mirror file of a virtual machine system disk can be in raw or qcow2 format, and the size is generally in the order of G bytes. If the virtual machine system disk adopts the Windows operating system, the mirror file of the operating system will be close to the order of 10G.

However, the virtual machine management module in the cloud computing platform architecture retrieves the mirror file through the virtual machine mirror management module, and pulls the mirror file to create the virtual machine. Since the virtual machine is created each time with the mirror file pulled from the mirror server through the virtual machine mirror management module, the loads on the server where the virtual machine mirror management module is located and on the mirror server are very heavy, and the speed of creating the virtual machine is relatively slow.

SUMMARY OF THE INVENTION

One of the purposes of the present application is to provide a method and device for pulling a virtual machine mirror file, in order to solve the technical problems mentioned in the background.

In a first aspect, the present application provides a method for pulling a virtual machine mirror file. The method includes: obtaining a mirror pulling instruction, the mirror pulling instruction comprising a timestamp of a mirror file to be pulled; determining whether the mirror pulling instruction instructs only a base mirror file to be pulled; if yes, obtaining locally the base mirror file previously dispatched to physical machines; and if not, obtaining locally the base mirror file previously dispatched to physical machines, and obtaining, locally or from a mirror server, an incremental file matching the timestamp of the mirror file to be pulled.

In some embodiments, the obtaining, locally or from a mirror server, of an incremental file matching the timestamp of the mirror file to be pulled comprises: determining whether a local physical machine stores an incremental file satisfying the mirror pulling instruction; and if yes, obtaining the incremental file from the local physical machine, and otherwise, sending an incremental file query instruction to a database storing a mirror file dependency link and pulling the incremental file from the mirror server based on a query result.

In some embodiments, the sending of an incremental file query instruction to a database storing a mirror file dependency link and pulling the incremental file from the mirror server based on a query result comprises: querying a dependency of the incremental file from the database, and querying, based on the dependency, whether the local physical machine stores a file on which the incremental file depends; and if not, pulling from the mirror server the file on which the incremental file depends.

In some embodiments, the method further includes: checking whether the base mirror file previously dispatched to physical machines is quoted by the virtual machine; if yes, retaining the checked base mirror file, and updating the timestamp of the checked base mirror file to the check timestamp; and if the base mirror file is not quoted by the virtual machine, and an interval between the time indicated by the timestamp of the checked base mirror file and a current time exceeds a preset interval, deleting the checked base mirror file.

In some embodiments, the method further includes: updating the base mirror file previously dispatched to the physical machines at a preset interval.

In some embodiments, the base mirror file includes: an original mirror file; or the original mirror file and a patch file for the original mirror file.

In some embodiments, the base mirror file comprises: the original mirror file and one patch file of the original mirror file.

In some embodiments, the incremental file is a mirror file generated based on a top file of virtual machine disk files during the virtual machine mirror file is created.

In some embodiments, the virtual machine mirror file adopts a qcow2 link structure.

In a second aspect, the present application provides a device for accelerating to pull a virtual machine mirror file. The device includes: a first obtaining unit configured to obtain a mirror pulling instruction, the mirror pulling instruction comprising a timestamp of a mirror file to be pulled; a determining unit configured to determine whether the mirror pulling instruction instructs only a base mirror file to be pulled; a second obtaining unit configured to obtain locally the base mirror file previously dispatched to physical machines, if the mirror pulling instruction instructs only a base mirror file to be pulled; and a third obtaining unit configured to obtain locally the base mirror file previously dispatched to physical machines and obtain, locally or from a mirror server, an incremental file matching the timestamp of the mirror file to be pulled, if the mirror pulling instruction instructs not only a base mirror file to be pulled.

In some embodiments, the third obtaining unit comprises: a determining sub-unit configured to determine whether a local physical machine stores an incremental file satisfying the mirror pulling instruction; a first obtaining sub-unit configured to obtain the incremental file from the local physical machine if the local physical machine stores the incremental file; and a first pulling sub-unit configured to send an incremental file query instruction to a database storing a mirror file dependency link and pull the incremental file from the mirror server based on a query result if the local physical machine has not stored the incremental file.

In some embodiments, the first pulling sub-unit comprises: a querying sub-unit configured to query a dependency of the incremental file from the database, and query, based on the dependency, whether the local physical machine stores a file on which the incremental file depends; and a second pulling sub-unit configured to pull from the mirror server the file on which the incremental file depends if the local physical machine has not stored a file on which the incremental file depends.

In some embodiments, the device further comprises: a checking unit configured to check whether the base mirror file previously dispatched to physical machines is quoted by the virtual machine; a first updating unit configured to retain the checked base mirror file and update the timestamp of the checked base mirror file to the check timestamp, if the base mirror file previously dispatched to physical machines is quoted by the virtual machine; and a deleting unit configured to delete the checked base mirror file, if the base mirror file is not quoted by the virtual machine, and an interval between the time indicated by the timestamp of the checked base mirror file and a current time exceeds a preset interval.

In some embodiments, the device further comprises: a second updating unit configured to update the base mirror file previously dispatched to the physical machines at a preset interval.

In some embodiments, the base mirror file in the device comprises: an original mirror file; or the original mirror file and a patch file for the original mirror file.

In some embodiments, the base mirror file in the device comprises: the original mirror file and one patch file of the original mirror file.

In some embodiments, the incremental file in the device is a mirror file generated based on a top file of virtual machine disk files during the virtual machine mirror file is created.

In some embodiments, the virtual machine mirror file in the device adopts a qcow2 link structure.

According to the method and device for pulling the virtual machine mirror file provided in the present application, a mirror pulling instruction is obtained first. Then, it is determined whether the mirror pulling instruction instructs only a base mirror file to be pulled. If the mirror pulling instruction instructs only a base mirror file to be pulled, the base mirror file previously dispatched to physical machines is obtained locally. If the mirror pulling instruction instructs not only a base mirror file to be pulled, the base mirror file previously dispatched to physical machines is obtained locally, and an incremental file matching the timestamp of the mirror file to be pulled is obtained locally or from a mirror server. Therefore, when the virtual machine is created, the amount of data of the virtual machine mirror file to be pulled is reduced, such that the period of pulling the mirror file is shortened, and the loads of a server where the virtual machine mirror management module is located and the loads of the mirror server are decreased. Accordingly, the creation of the virtual machine may be accelerated, and the virtual machine can be provided speedy for service.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF THE EMBODIMENTS

Figure 1:
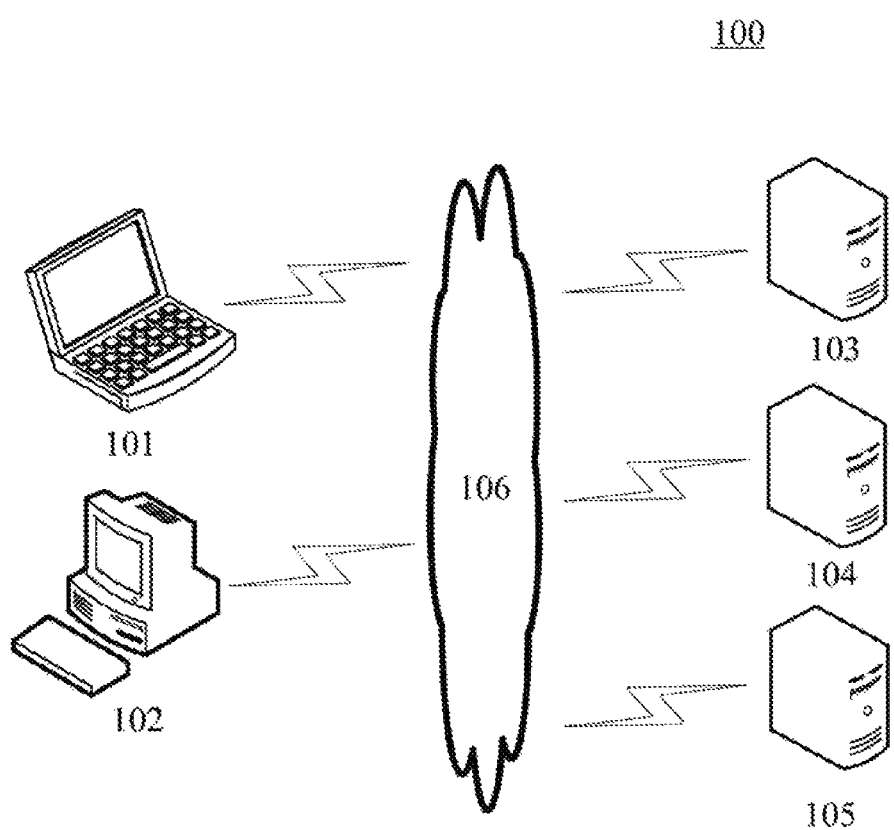
FIG. 1 shows an exemplary system architecture capable of applying a method and device for pulling a virtual machine mirror file of an embodiment of the present application.

Hereinafter, the embodiments of the present application will be described in conjunction with the accompanying drawings. It should be understood that the specific embodiments are merely used for illustrating the application, without making limitations thereto. Further, to facilitate the description of the application, only portions related to the application are shown in the drawings.

Moreover, the embodiments in the present application, as well as the features in the embodiments, may be combined with each other if there is no conflict. Hereinafter, the present application will be described in details according to the accompanying drawings in conjunction with the embodiments.

FIG. 1 illustrates an exemplary system architecture 100 applicable for the method and device for pulling a virtual machine mirror file according to the embodiments of the present application.

As shown in FIG. 1, the system architecture 100 may include, but not be limited to, terminal devices 101 and 102, a cloud computing platform including servers 103, 104 and 105, and a network 106. The network 106 is configured to provide communication links between the terminal devices 101 and 102 and the cloud computing platform, or between the servers 103, 104 and 105 in the cloud computing platform. The network 106 may provide various connection types, such as wired or wireless communication links, or optical fiber cables.

A user may manage, through the terminal devices 101 and 102, a virtual machine running on the cloud computing platform, for example, submit a request for creating a virtual machine snapshot and the like. The virtual machine may be set up on any server or a combination of servers in the cloud computing platform, for example, on the server 103, 104 or 105. The virtual machine may be installed with various applications, such as a web page browser application, a shopping application, a search application, an instant communication tool, a mail client, and a social platform software.

The servers 103, 104 and 105 forming the cloud computing platform may be devices providing various computing services, for example, receiving a request submitted by the user through a terminal device, analyzing the request, and returning a processing result to the user through the terminal device.

It should be noted that the method for pulling a virtual machine mirror file provided in the embodiment of the present invention is generally executed by using a virtual machine management module deployed in the above-mentioned cloud computing platform architecture, and the management module may be deployed in any server or a combination of servers in the cloud computing platform. For example, the management module may be a Nova-compute computing component in an OpenStack cloud computing management platform architecture and may be deployed in any server 103, 104 or 105, or in any combination of the servers 103, 104 and 105. Accordingly, the apparatus for creating a system disk snapshot of a virtual machine is also deployed in any server or a combination servers in the cloud computing platform.

A person skilled in the art should understand that the numbers of the terminal devices, the networks and the servers in FIG. 1 are merely illustrative. Following practical requirements, any numbers of the terminal devices, networks and servers may be provided.

Figure 2:
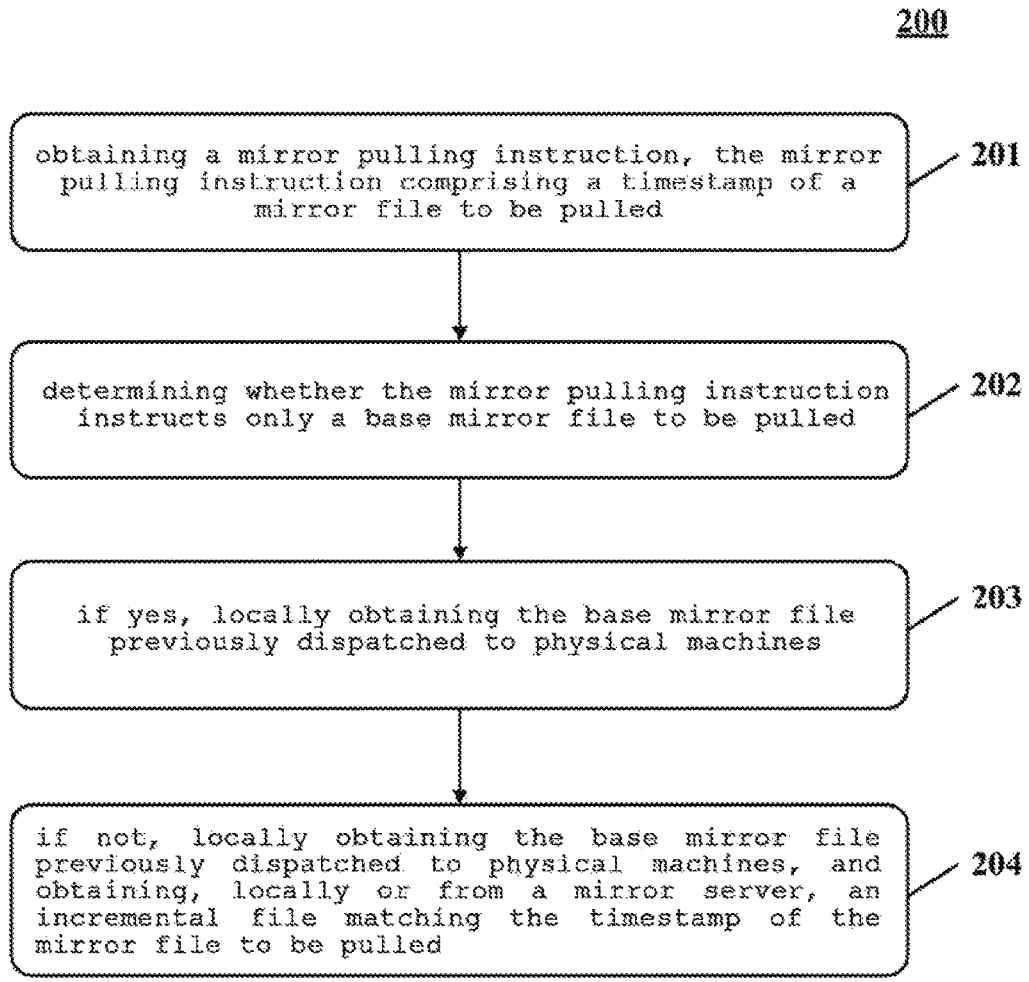
FIG. 2 shows a schematic flowchart of a method for pulling a virtual machine mirror file according to an embodiment of the present application.

FIG. 2 illustrates a schematic flow chart of a method for pulling a virtual machine mirror file according to an embodiment of the present application. As shown in FIG. 2, the method 200 for pulling a virtual machine mirror file includes the following steps.

At step 201, a mirror pulling instruction is obtained, which comprises a timestamp of a mirror file to be pulled.

In the embodiment, an electronic device (e.g., the server as shown in FIG. 1) where the method for pulling a virtual machine mirror file runs may receive a virtual machine creation request from a terminal used by a user for interaction in a wired or wireless connection. The wireless connection may include, but not limited to, 3G/4G connection, WiFi connection, Bluetooth connection, WiMAX connection, Zigbee connection, ultra wideband (UWB) connection and other wireless connections known or to be developed.

Generally, the user submits the virtual machine creation request through a web browser or client application installed on the terminal. At this time, the user may initiate the virtual machine creation request to the web server or client application by directly inputting an instruction or clicking a link of submitting the virtual machine creation request displayed in the web browser or client application. The virtual machine creation request generally includes parameters of a virtual machine disk file set by the user, and the parameters of the virtual machine disk file may include a timestamp for creating a mirror file of the virtual machine disk file.

Thereafter, the virtual machine management module (e.g., the operation component Nova in the cloud computing platform architecture OpenStack which may be operated in a server or the combination of the servers as shown in FIG. 1) in the cloud computing platform architecture receiving the virtual machine creation request from the user obtains the mirror pulling instruction according to the received virtual machine creation request. The mirror pulling instruction includes a timestamp of a mirror file in the virtual machine creation request to be pulled.

At step 202, whether the pulling instruction instructs only a base mirror file to be pulled is determined.

In the embodiment, the virtual machine management module evaluates the mirror pulling instruction obtained in the step 201 to determine whether the mirror pulling instruction instructs only a base mirror file to be pulled.

The base mirror file herein may be a certain release version file of an operating system or the combination of a certain release version file of the operating system and a system patch file, and may also be a virtual machine disk file preset by the user. The virtual machine disk file may include a certain release version file of an operating system and an operating system patch or application software serving as a user defined patch and preset by the user, etc.

If the certain release version file of the operating system is used as an original mirror file, and other operating system patch files, the application software preset by the user and the like are used as the patch files of the original mirror file, the base mirror file may include, but not limited to, the original mirror file or the patch file of the original mirror file.

Figure 3:
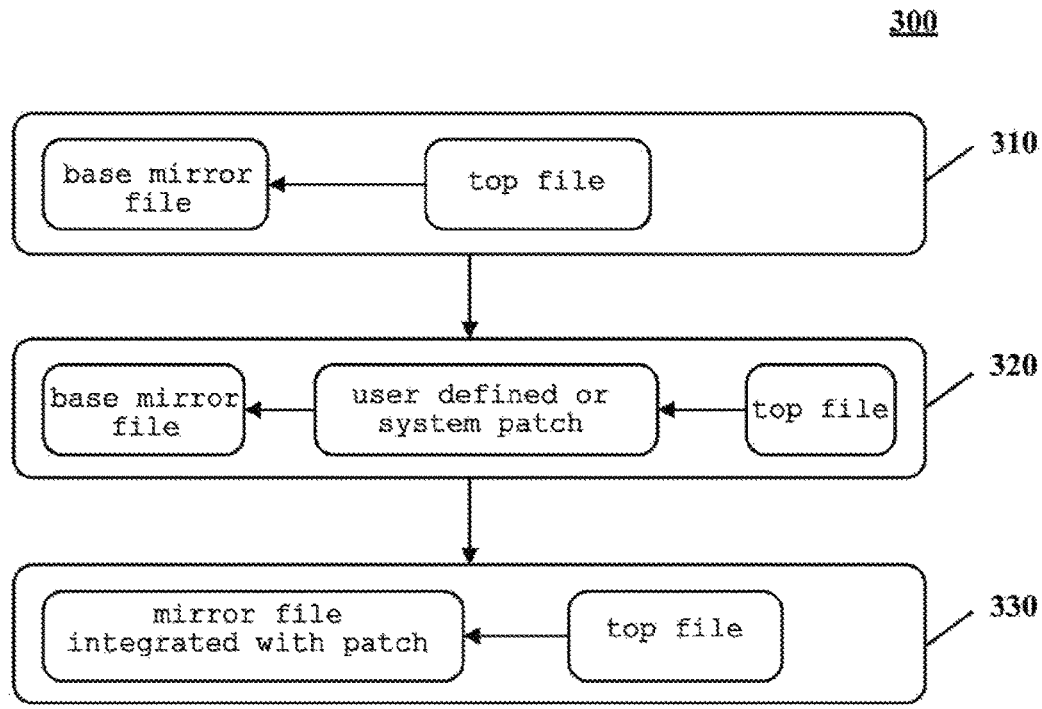
FIG. 3 shows a structure diagram of a base mirror file according to an embodiment of the present application.

As an example, FIG. 3 shows a structure diagram of a base mirror file according to an embodiment of the present application. When a virtual machine system disk has no patch, the structure 310 of a system disk file includes the base mirror file and a top file, and the top file depends on the base mirror file. When the virtual machine system disk has a patch, the structure 520 of the system disk file includes the base mirror file, a user defined patch or system patch, and the top file. The user defined patch or system patch depends on the base mirror file, and the top file depends on the user defined patch or system patch file. In order to further decrease unnecessary large files stored in the virtual machine disk, the user defined patch or system patch may be merged into the base mirror file to obtain a patched mirror file. The patched mirror file is used as a new base mirror file, and the sharing rate of the new base mirror file may be enhanced.

In order to prevent excessive patches from influencing the sharing rate of the base mirror file, the quantity of the patches may be limited within a relatively small range. For example, the files may be limited to the original mirror file and one patch of the original mirror file.

Returning to FIG. 2, At step 203, if the pulling instruction instructs only a base mirror file to be pulled, the base mirror file previously dispatched to physical machines is obtained locally.

In the embodiment, the base mirror file is pre-stored in the physical machines constituting the cloud computing platform. If the virtual machine management module determines that the pulling instruction instructs only a base mirror file to be pulled, the virtual machine management module may send an obtaining instruction to a host physical machine allocated for the virtual machine, so that the host physical machine obtains the base mirror file pre-stored in the physical machine.

In some alternative implementations of the embodiment, in order to ensure that the obtain localized base mirror file previously dispatched to physical machines is the newest base mirror file, the method for pulling the virtual machine mirror file may further include: updating the base mirror file previously dispatched to the physical machines at a preset interval.

At step 204, if the pulling instruction instructs not only a base mirror file to be pulled, the base mirror file previously dispatched to physical machines is obtain localized, and an incremental file matching the timestamp of the mirror file to be pulled is obtained locally or from a mirror server.

In the embodiment, if the virtual machine management module determines that the pulling instruction instructs not only a base mirror file to be pulled, the virtual machine management module may send an obtaining instruction to the host physical machine allocated to the virtual machine, so that the host physical machine pulls virtual machine creation files. The base mirror file may be directly pulled locally. The incremental file rather than the base mirror file may be pulled locally or pulled from the mirror sever by a virtual machine mirror management module in the cloud computing platform architecture, according to the storage location of the incremental file. The incremental file is a mirror file generated based on a top file of virtual machine disk files during the virtual machine mirror file is created.

In some alternative implementations of the embodiment, the obtaining, locally or from a mirror server, of an incremental file matching the timestamp of the mirror file to be pulled may include, but not limited to: determining whether a local physical machine stores an incremental file satisfying the mirror pulling instruction; and if yes, obtaining the incremental file from the local physical machine, and otherwise, sending an incremental file query instruction to a database storing a mirror file dependency link and pulling the incremental file from the mirror server based on a query result.

In the implementation, the database storing the mirror file dependency link may be a database storing the metadata of the mirror file in the cloud computing platform architecture, for example, a database storing the metadata of the mirror file in the virtual machine mirror management module.

After sending the incremental file query instruction to and obtaining the query result from the database storing the mirror file dependency link, the virtual machine management module may pull the incremental file from the mirror server based on the query result. For example, the virtual machine management module may query a dependency of the incremental file from the database, and query, based on the dependency, whether the local physical machine stores a file on which the incremental file depends; and if not, pull from the mirror server the file on which the incremental file depends.

In the embodiment, the virtual machine mirror file adopts a link structure. For example, the virtual machine mirror file may adopt a qcow2 link structure.

Figure 4:
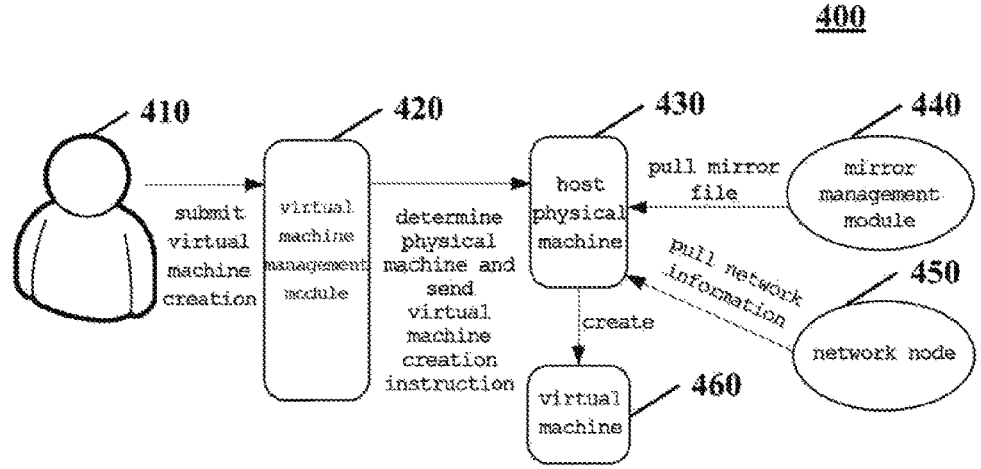
FIG. 4 shows a schematic diagram of an application scenario of a method for pulling a virtual machine mirror file according to an embodiment of the present application.

Referring to FIG. 4, it shows a schematic diagram of an application scenario of the method for pulling a virtual machine mirror file according to an embodiment of the present application. In the application scenario of FIG. 4, a user 410 submits a virtual machine creation request to the virtual machine management module through the terminal device. Thereafter, the virtual machine management module 420 in the cloud computing platform architecture determines a host physical machine 430 for the virtual machine and sends a virtual machine creation instruction to the host physical machine 430 in response to the received request. The virtual machine creation instruction includes parameters of the virtual machine disk file set by the user, and the parameters of the virtual machine disk file may include a timestamp for creating a mirror file of the virtual machine disk file. The host physical machine 430 pulls the mirror file through a mirror management module 440, and pulls network information from a network node 450, according to the virtual machine creation instruction in response to the received virtual machine creation instruction. Then, the host physical machine 430 accomplishes the creation of the virtual machine 460 according to the pulled mirror file and network information.

Based on the method for pulling the virtual machine mirror file according to the embodiment of the present application, the amount of data of the virtual machine mirror file to be pulled by the virtual machine mirror management module is reduced by using the base mirror file previously dispatched to physical machines, such that the period of pulling the mirror file is shortened, and the loads of a server where the virtual machine mirror management module is located and the loads of the mirror server are decreased. Accordingly, the creation of the virtual machine may be accelerated.

Figure 5:
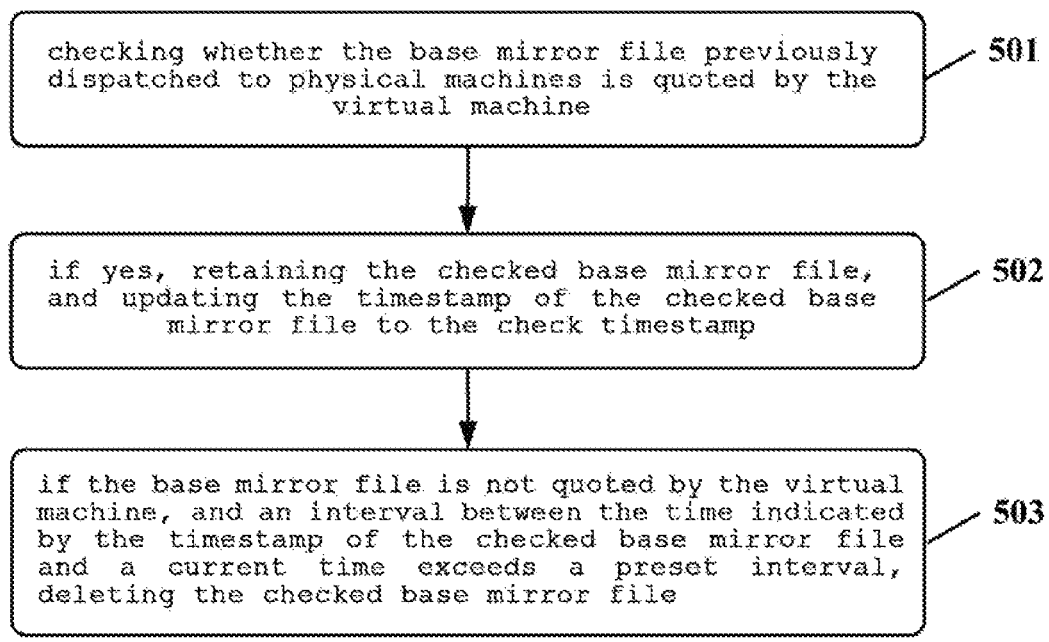
FIG. 5 shows a process of a method for improving disk space utilization efficiency of a physical machine according to an embodiment of the present application.

Referring to FIG. 5, it shows a process 500 of a method for improving the disk space utilization efficiency of a physical machine according to an embodiment of the present application. The process 500 for improving the disk space utilization efficiency of the physical machine may further include the following steps on the basis of the method for pulling the virtual machine mirror file as shown in FIG. 2.

Step 501 is to check whether the base mirror file previously dispatched to physical machines is quoted by the virtual machine.

In a logical cloud computing product, mirror files of an operating system supported by the virtual machine are always continuously increased, and even in some of the cloud computing products, a mirror market is provided (the user may produce a mirror system by himself), resulting in a large number of mirror files in the products. In order to ensure relatively high usage efficiency of the mirror files in the cloud computing product and reduce the storage space of the physical machine consumed by the mirror files, the virtual machine management module needs to manage the base mirror file previously dispatched to physical machines according to whether the base mirror file previously dispatched to physical machines is quoted.

When determining whether the base mirror file previously dispatched to physical machines is quoted, the virtual machine management module may compare the virtual machine disk file operated in the physical machine with the base mirror file previously dispatched to physical machines. It is determined that the base mirror file is quoted, if the base mirror file previously dispatched to physical machines exists in the link structure of the virtual machine disk file.

Step 502 is to retain the checked base mirror file and update the timestamp of the checked base mirror file to the check timestamp, if the base mirror file is quoted.

In the embodiment, if determining that the base mirror file previously dispatched to physical machines is quoted by the virtual machine according to the check result in the step 501, the virtual machine management module retains the checked base mirror file and updates the timestamp of the checked base mirror file to the check timestamp.

Step 503 is to delete the checked base mirror file, if the base mirror file is not quoted by the virtual machine and an interval between the time indicated by the timestamp of the checked base mirror file and a current time exceeds a preset interval.

In the embodiment, if determining that the base mirror file previously dispatched to physical machines is not quoted by the virtual machine according to the check result in the step 501, and the interval between the time indicated by the timestamp of the checked base mirror file and a current time exceeds a preset interval, the virtual machine management module deletes the checked base mirror file. That is, when the checked base mirror file is not quoted by the virtual machine and the service life of the checked base mirror file reaches a preset service life, the checked base mirror file is deleted.

According to the method for improving the effective storage rate of the base mirror file, the base mirror file previously dispatched to the physical machines is checked, and the base mirror file unquoted and reaching the preset service life is deleted, so as to improve the disk space utilization efficiency of the physical machine.

Figure 6:
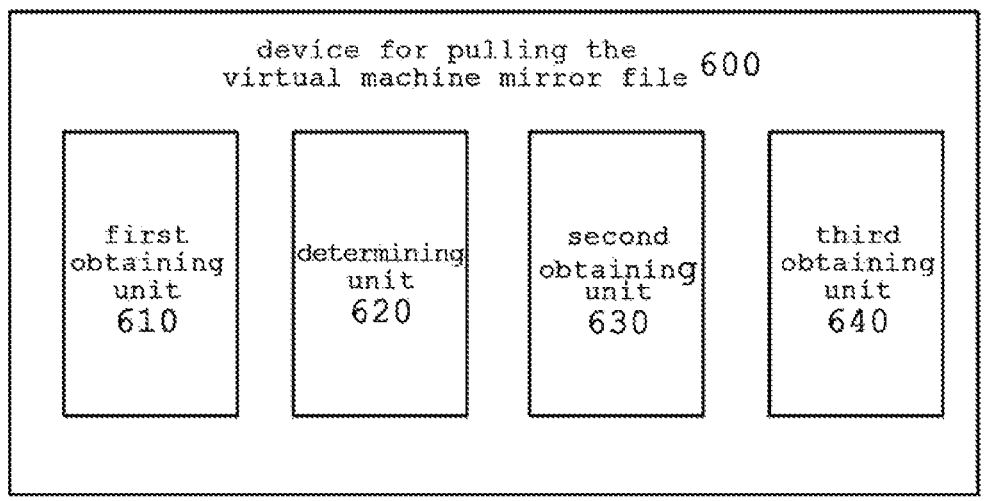
FIG. 6 shows an exemplary structure diagram of a device for pulling a virtual machine mirror file according to an embodiment of the present application.

Referring to FIG. 6, as an implementation of the method as shown in the above figures, a device for pulling a virtual machine mirror file is provided in an embodiment of the present application, which corresponds to the method of the embodiment as shown in FIG. 2, and the device may be specifically applied to a variety of electronic devices.

As shown in FIG. 6, the device 600 for accelerating to pull the virtual machine mirror file according to the embodiment includes: a first obtaining unit 610, a determining unit 620, a second obtaining unit 630 and a third obtaining unit 640. Specifically, the first obtaining unit 610 is configured to obtain a mirror pulling instruction, the mirror pulling instruction comprising but not limited to a timestamp of a mirror file to be pulled; the determining unit 620 is configured to determine whether the mirror pulling instruction instructs only a base mirror file to be pulled; the second obtaining unit 630 is configured to obtain locally the base mirror file previously dispatched to physical machines, if the mirror pulling instruction instructs only a base mirror file to be pulled; and the third obtaining unit 640 is configured to obtain locally the base mirror file previously dispatched to physical machines and obtain, locally or from a mirror server, an incremental file matching the timestamp of the mirror file to be pulled, if the mirror pulling instruction instructs not only a base mirror file to be pulled.

In the embodiment, the first obtaining unit 610 of the device 600 for accelerating to pull the virtual machine mirror file may obtain the mirror pulling instruction according to a received virtual machine creation request, wherein the mirror pulling instruction includes a timestamp of the mirror file to be pulled in the virtual machine creation request.

In the embodiment, the determining unit 620 may judge the mirror pulling instruction obtained by the first obtaining unit 610, in order to judge whether the pulling instruction instructs only the base mirror file to be pulled. In some implementations, the base mirror file in the device may include, but not limited to: an original mirror file; or the original mirror file and a patch file of the original mirror file. In a further implementation, the base mirror file in the device may include, but not limited to: the original mirror file and one patch file of the original mirror file.

In the embodiment, the base mirror file is pre-stored in the physical machines forming the cloud computing platform. The second obtaining unit 630 may pull a virtual machine creation file according to a first judgment result of the determining unit 620: if determining that the pulling instruction instructs only the base mirror file to be pulled, the second obtaining unit 630 obtains the base mirror file pre-stored in the physical machine from a host physical machine allocated by the virtual machine management module for the virtual machine.

In the embodiment, the third obtaining unit 640 may pull files for creating the virtual machine according to a second judgment result of the determining unit 620: if determining that the pulling instruction instructs not only the base mirror file to be pulled, the third obtaining unit 640 pulls files for creating the virtual machine. The base mirror file may be directly pulled locally. The incremental file rather than the base mirror file may be pulled locally or pulled from the mirror sever by a virtual machine mirror management module in the cloud computing platform architecture, according to the storage location of the incremental file. The incremental file is a mirror file generated based on a top file of virtual machine disk files during the virtual machine mirror file is created. In some implementations, the incremental file in the device is a mirror file generated based on a top file of virtual machine disk files during the virtual machine mirror file is created.

In the embodiment, the virtual machine mirror file in the device adopts a qcow2 link structure.

In some alternative implementations of the embodiment, the third obtaining unit may include, but not limited to (not shown in the drawings): a determining sub-unit configured to determine whether a local physical machine stores an incremental file satisfying the mirror pulling instruction; a first obtaining sub-unit configured to obtain the incremental file from the local physical machine if the local physical machine stores the incremental file; and a first pulling sub-unit configured to send an incremental file query instruction to a database storing a mirror file dependency link and pull the incremental file from the mirror server based on a query result if the local physical machine has not stored the incremental file.

In some alternative implementations of the embodiment, the first pulling sub-unit may include, but not limited to (not shown in the drawings): a querying sub-unit configured to query a dependency of the incremental file from the database, and query, based on the dependency, whether the local physical machine stores a file on which the incremental file depends; and a second pulling sub-unit configured to pull from the mirror server the file on which the incremental file depends if the local physical machine has not stored a file on which the incremental file depends.

In some alternative implementations of the embodiment, the device may further include, but not limited to (not shown in the drawings): a checking unit configured to check whether the base mirror file previously dispatched to physical machines is quoted by the virtual machine; a first updating unit configured to retain the checked base mirror file and update the timestamp of the checked base mirror file to the check timestamp, if the base mirror file previously dispatched to physical machines is quoted by the virtual machine; and a deleting unit configured to delete the checked base mirror file, if the base mirror file is not quoted by the virtual machine, and an interval between the time indicated by the timestamp of the checked base mirror file and a current time exceeds a preset interval.

In some alternative implementations of the embodiment, the device may further include, but not limited to (not shown in the drawings): a second updating unit configured to update the base mirror file previously dispatched to the physical machines at a preset interval.

Those skilled in the art should understand that the units recorded in the device 600 correspond to the steps in the method described with reference to FIG. 2. Therefore, the operations and features described for the method for pulling a virtual machine mirror file are also applicable to the device 600 and the units contained therein, which will not be repeated herein. The corresponding units in the device 600 may cooperate with units in a terminal device or a server to realize the solutions of the embodiment of the present application.

Those skilled in the art may understand that the device 600 for accelerating to pull the virtual machine mirror file further includes some other known structures, for example, a processor, and a memory. In order to avoid unnecessarily obscuring the embodiments of the present disclosure, these known structures are not shown in FIG. 6.

Figure 7:
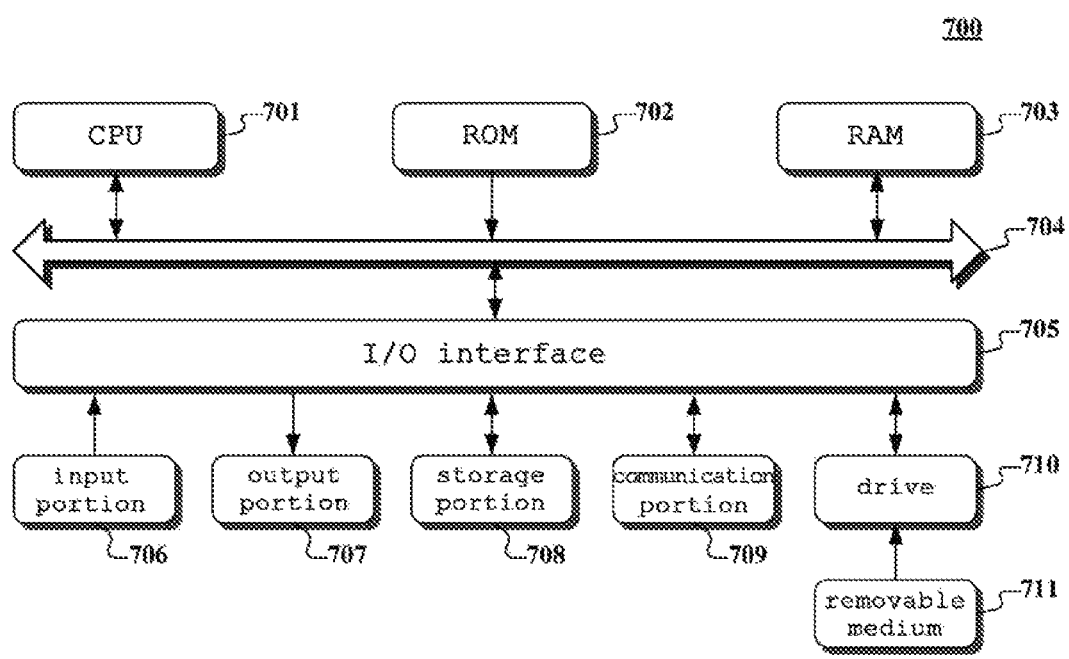
FIG. 7 shows a schematic structural diagram of a computer system adapted to implement a terminal apparatus or a server of the embodiments of the present application.

Referring to FIG. 7, a schematic structural diagram of a computer system 700 adapted to implement a terminal apparatus or a server of the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as needed. A removable medium 711, such as a magnetic disk, an optical disk, a magneto-optical disk, and a semiconductor memory, may be placed on the drive 710, to enable the retrieval of a computer program from the removable medium 711, and the installation thereof on the storage portion 708 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 809, and/or may be installed from the removable media 811.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first obtaining unit, a determining unit, a second obtaining unit, and a third obtaining unit, where the names of these units or modules are not considered as a limitation to the units or modules. For example, the first obtaining unit may also be described as "a unit for obtaining a mirror pulling instruction".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: obtain a mirror pulling instruction, the mirror pulling instruction comprising a timestamp of a mirror file to be pulled; determine whether the mirror pulling instruction instructs only a base mirror file to be pulled; if yes, obtain locally the base mirror file previously dispatched to physical machines; and if not, obtain locally the base mirror file previously dispatched to physical machines, and obtain, locally or from a mirror server, an incremental file matching the timestamp of the mirror file to be pulled.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for pulling a virtual machine mirror file, comprising:
   obtaining a mirror pulling instruction, the mirror pulling instruction comprising a timestamp of a mirror file to be pulled;
   determining whether the mirror pulling instruction instructs pulling only a base mirror file previously dispatched to physical machines, the base mirror file being a release version file of an operating system or the combination of a release version file of an operating system and a system patch file; and the timestamp being used to search for the incremental file;
   if yes, obtaining locally the base mirror file previously dispatched to physical machines; and
   if not, (i) obtaining locally the base mirror file previously dispatched to physical machines; (ii) searching for an incremental file matching the timestamp of the mirror file to be pulled, the incremental file representing the difference between the mirror file to be pulled and the base mirror file; and (iii) obtaining, locally or from a mirror server, the incremental file matching the timestamp of the mirror file to be pulled.

2. The method of claim 1, wherein the obtaining, locally or from a mirror server, of an incremental file matching the timestamp of the mirror file to be pulled comprises:
   determining whether a local physical machine stores an incremental file satisfying the mirror pulling instruction; and
   if yes, obtaining the incremental file from the local physical machine, and otherwise, sending an incremental file query instruction to a database storing a mirror file dependency link and pulling the incremental file from the mirror server based on a query result.

3. The method of claim 2, wherein the sending of an incremental file query instruction to a database storing a mirror file dependency link and pulling the incremental file from the mirror server based on a query result comprises:
    querying a dependency of the incremental file from the database, and querying, based on the dependency, whether the local physical machine stores a file on which the incremental file depends; and
    if not, pulling from the mirror server the file on which the incremental file depends.

4. The method of claim 1, further comprising:
    checking whether the base mirror file previously dispatched to physical machines is quoted by the virtual machine;
    if yes, retaining the checked base mirror file, and updating the timestamp of the checked base mirror file to the check timestamp; and
    if the base mirror file is not quoted by the virtual machine, and an interval between the time indicated by the timestamp of the checked base mirror file and a current time exceeds a preset interval, deleting the checked base mirror file.

5. The method of claim 4, further comprising:
    updating the base mirror file previously dispatched to the physical machines at a preset interval.

6. The method of claim 5, wherein the base mirror file comprises:
    an original mirror file; or
    the original mirror file and a patch file for the original mirror file.

7. The method of claim 6, wherein the base mirror file comprises: the original mirror file and one patch file of the original mirror file.

8. The method of claim 7, wherein the incremental file is a mirror file generated based on a top file of virtual machine disk files during the virtual machine mirror file is created.

9. The method of claim 8, wherein the virtual machine mirror file adopts a qcow2 link structure.

10. A device for accelerating to pull a virtual machine mirror file, comprising:
    a first obtaining unit configured to obtain a mirror pulling instruction, the mirror pulling instruction comprising a timestamp of a mirror file to be pulled;
    a determining unit configured to determine whether the mirror pulling instruction instructs pulling only a base mirror file previously dispatched to physical machines, the base mirror file being a release version file of an operating system or the combination of a release version file of an operating system and a system patch file; and the timestamp being used to search for the incremental file;
    a second obtaining unit configured to obtain locally the base mirror file previously dispatched to physical machines, if the mirror pulling instruction instructs pulling only the base mirror file; and
    a third obtaining unit configured to: (i) obtain locally the base mirror file previously dispatched to physical machines, (ii) search for an incremental file matching the timestamp of the mirror file to be pulled, the incremental file representing the difference between the mirror file to be pulled and the base mirror file, and (iii) obtain, locally or from a mirror server, the incremental file matching the timestamp of the mirror file to be pulled, if the mirror pulling instruction instructs not only a base mirror file to be pulled.

11. The device of claim 10, wherein the third obtaining unit comprises:
    a determining sub-unit configured to determine whether a local physical machine stores an incremental file satisfying the mirror pulling instruction;
    a first obtaining sub-unit configured to obtain the incremental file from the local physical machine if the local physical machine stores the incremental file; and
    a first pulling sub-unit configured to send an incremental file query instruction to a database storing a mirror file dependency link and pull the incremental file from the mirror server based on a query result if the local physical machine has not stored the incremental file.

12. The device of claim 11, wherein the first pulling sub-unit comprises:
    a querying sub-unit configured to query a dependency of the incremental file from the database, and query, based on the dependency, whether the local physical machine stores a file on which the incremental file depends; and
    a second pulling sub-unit configured to pull from the mirror server the file on which the incremental file depends if the local physical machine has not stored a file on which the incremental file depends.

13. The device of claim 10, further comprising:
    a checking unit configured to check whether the base mirror file previously dispatched to physical machines is quoted by the virtual machine;
    a first updating unit configured to retain the checked base mirror file and update the timestamp of the checked base mirror file to the check timestamp, if the base mirror file previously dispatched to physical machines is quoted by the virtual machine; and
    a deleting unit configured to delete the checked base mirror file, if the base mirror file is not quoted by the virtual machine, and an interval between the time indicated by the timestamp of the checked base mirror file and a current time exceeds a preset interval.

14. The device of claim 13, further comprising:
    a second updating unit configured to update the base mirror file previously dispatched to the physical machines at a preset interval.

15. The device of claim 14, wherein the base mirror file in the device comprises:
    an original mirror file; or
    the original mirror file and a patch file for the original mirror file.

16. The device of claim 15, wherein the base mirror file in the device comprises: the original mirror file and one patch file of the original mirror file.

17. The device of claim 16, wherein the incremental file in the device is a mirror file generated based on a top file of virtual machine disk files during the virtual machine mirror file is created.

18. The device of claim 17, wherein the virtual machine mirror file in the device adopts a qcow2 link structure.

19. A non-transitory storage medium storing one or more programs, the one or more programs when executed by an apparatus, causing the apparatus to perform a method for pulling a virtual machine mirror file, the method comprising:
    obtaining a mirror pulling instruction, the mirror pulling instruction comprising a timestamp of a mirror file to be pulled;
    determining whether the mirror pulling instruction instructs pulling only a base mirror file previously dispatched to physical machines, the base mirror file being a release version file of an operating system or the combination of a release version file of an operating system and a system patch file; and the timestamp being used to search for the incremental file;

if yes, obtaining locally the base mirror file previously dispatched to physical machines; and if not, (i) obtaining locally the base mirror file previously dispatched to physical machines, (ii) searching for an incremental file matching the timestamp of the mirror file to be pulled, the incremental file representing the difference between the mirror file to be pulled and the base mirror file, and (iii) obtaining, locally or from a mirror server, the incremental file matching the timestamp of the mirror file to be pulled.

* * * * *